(12) United States Patent
Liu

(10) Patent No.: US 8,783,632 B2
(45) Date of Patent: Jul. 22, 2014

(54) SUPPORTER RETAINED BY BOTTOM OF FURNITURE

(76) Inventor: Chi-Jui Liu, Taipei Hsien (TW)

( * ) Notice: Subject to any disclaimer, the term of this patent is extended or adjusted under 35 U.S.C. 154(b) by 136 days.

(21) Appl. No.: 13/429,438

(22) Filed: Mar. 26, 2012

(65) Prior Publication Data
US 2013/0248663 A1   Sep. 26, 2013

(51) Int. Cl.
*A47F 5/00*   (2006.01)
(52) U.S. Cl.
USPC ................. 248/188.91; 248/176.3; 248/122.1
(58) Field of Classification Search
USPC .......... 248/176.1, 177.1, 176.3, 188.1, 188.8, 248/188.91, 121, 122.1
See application file for complete search history.

(56) References Cited

U.S. PATENT DOCUMENTS

| | | | | |
|---|---|---|---|---|
| D306,383 S | * | 3/1990 | Strater | D6/511 |
| 7,819,247 B2 | * | 10/2010 | Gonzalez | 206/320 |
| 7,922,137 B2 | * | 4/2011 | Derry et al. | 248/274.1 |
| 7,946,542 B1 | * | 5/2011 | Chapman | 248/122.1 |
| 8,272,602 B2 | * | 9/2012 | Ye | 248/122.1 |
| 8,272,604 B2 | * | 9/2012 | Foster | 248/124.1 |
| 2011/0147547 A1 | * | 6/2011 | Fitzpatrick et al. | 248/157 |

* cited by examiner

*Primary Examiner* — Steven Marsh

(57) ABSTRACT

A supporter includes a rectangular plate or polygonal base plate. The base plate has a plurality of threaded hole for arranging at least two pushers. Four plastic feet are arranged to four bottom corners of the base plate for stand. The pusher consists of a claw, pusher shaft, and a nut. A sleeve is arranged to a predetermined position of the base plate or a front end of a slider for connecting an extension supporting rack. The sleeve has a lower round base for connecting the base plate and an upper hollow cylinder for receiving the extension support rack. The supporter is fixed to a bottom of a couch or bed for linking the extension supporting rack.

7 Claims, 7 Drawing Sheets

SUPPORTER RETAINED BY BOTTOM OF FURNITURE

FIELD OF THE INVENTION

The present invention relates to a supporter retained by a bottom of a furniture, and particular to a supporter fixed to a bottom of a couch or a bed.

DESCRIPTION OF THE PRIOR ART

Information products play an important role in modern life, in office and in the house. Accessories for handling those information products are also continuously invented.

For example, a computer chair capable of lower the stress of user's arm has five claw feet with roller so that user can move at will. The shaft of the chair can be adjusted and rotated for height and direction so that the user can move and turn on the seat. The armrests thereof also have a supporter for wrist or a mouse pad to ease the load of the hand. However, the devices such as a laptop or a tablet PC still need to be placed on a desk or user's lap to operate.

To use a computer or laptop on a desk and a chair is not the only option. In most of time, users prefer to use their laptop on a couch or on a bed. Prior supporters for laptop can be fixed to a couch or a bed by bolts. However, damage to the furniture could happen and the assembling is difficult. Therefore, to provide a supporter with quick installation and no harm to furniture is the object of present invention and also a benefit for users.

SUMMARY OF THE PRESENT INVENTION

Accordingly, the primary object of the present invention is to provide a supporter fixed to a bottom of a couch or a bed for receiving an extension support rack. By adjusting pushers of the supporter to approach the bottom of a couch and turning supporting bolts to raise the supporter, the supporter will clutch the couch and be fixed to the position. The extension supporting rack can be further slid into a sleeve of the supporter for operation.

To achieve above object, the present invention provides a supporter including a polygonal base plate having a plurality of through hole. Four feet are arranged to four bottom corners of the base plate for stand. Two pushers can be threaded into the base plate. At least one supporting bolt serves to elevate the support and the pusher to clutch or release the couch. A long slider is sliding arranged to the base plate. An outer end of the slider has a through hole. A sleeve has a round base on a lower portion and a hollow cylinder on an upper portion. The base has a flat cut on a side for preventing interference. The base is fixed to the slider above the through hole. A bolt set is arranged to the through hole through the sleeve for securing the position of the slider.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
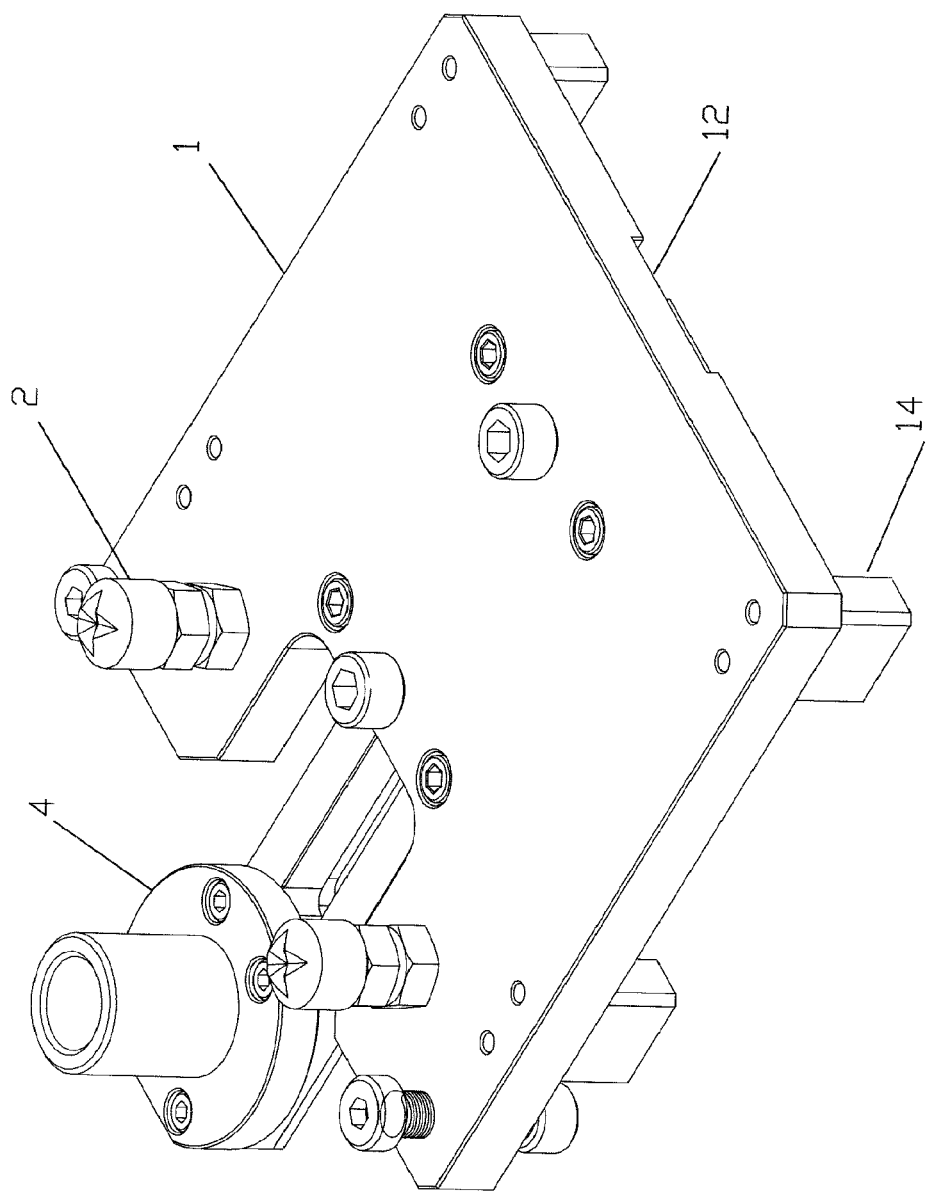
FIG. 1 is a schematic view of a preferable embodiment of the present invention.
Figure 2:
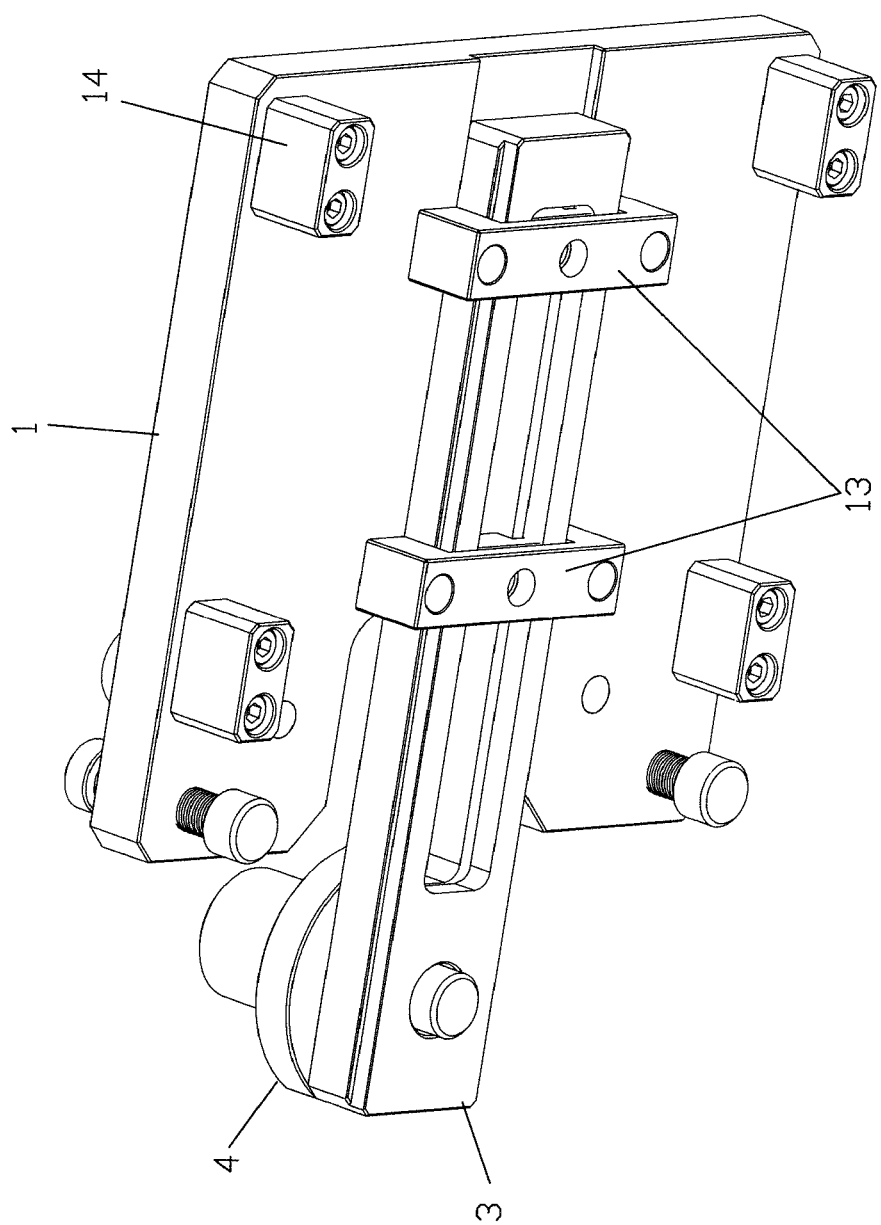
FIG. 2 is a schematic view showing a bottom of the preferable embodiment of the present invention.
Figure 3:
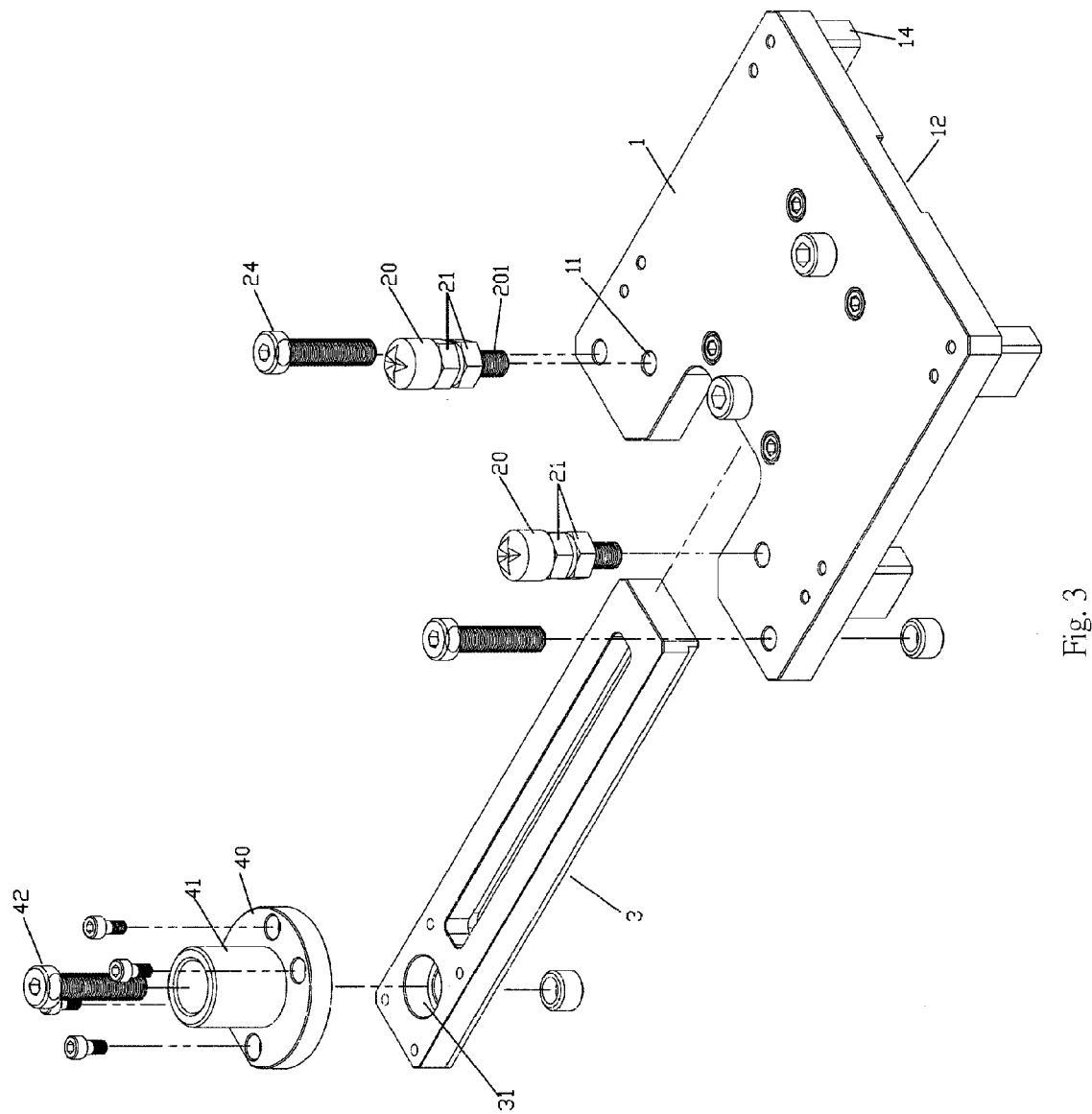
FIG. 3 is an exploded view of the preferable embodiment of the present invention.

Referring to FIGS. 1 to 3, a preferable embodiment of a supporter according to the present invention is illustrated. The supporter includes the following components.

A base plate 1 is an approximate rectangle having a rectangular notch 10 on a middle of an edge thereof. A plurality of threaded hole 11 is formed to the base plate 1. A shallow recess 12 is formed to a bottom surface of the base plate 1, an end of the recess 12 connects with an inner edge of the notch 10 as shown in FIG. 2. Two retainers 13 are fixed across the recess 12 so that a groove is formed to the recess 12. Feet 14 are formed to the four bottom corners of the base plate 1 so that the base plate 1 can stand on the floor.

Two pushers 2 are screwed into the threaded holes 11. The pusher 2 further includes the following components.

A claw 20 has a plurality of tip on an end thereof, a hole is formed to the other end of the claw 20.

A pusher shaft 201 has a protrusion on an end for retaining the hole of the claw 20, and the other end of the pusher shaft 201 is a threaded end which can be threaded into the threaded hole 11. By turning the pusher shaft 201, the elongation of the pusher can be adjusted.

A nut 21 is arranged to the threaded end to fix the pusher shaft 201.

A supporting bolt 24 serves to elevate the support so that the pushers 2 can clutch or release a bottom of a couch.

A slider 3 is a long plate slid into the recess 10 of the base plate 1. The slider 3 can slide along the recess 10 within the retainer. An outer end of the slider 3 has a through hole 31.

A sleeve 4 has a round base 40 on a lower portion and a hollow cylinder 41 on an upper portion. The base 40 has a flat cut on a side for preventing interference. The base 40 is fixed to the slider 3 above the through hole 31. A bolt set 42 is arranged to the through hole 31 through the sleeve for securing the position of the slider 3.

Figure 4:
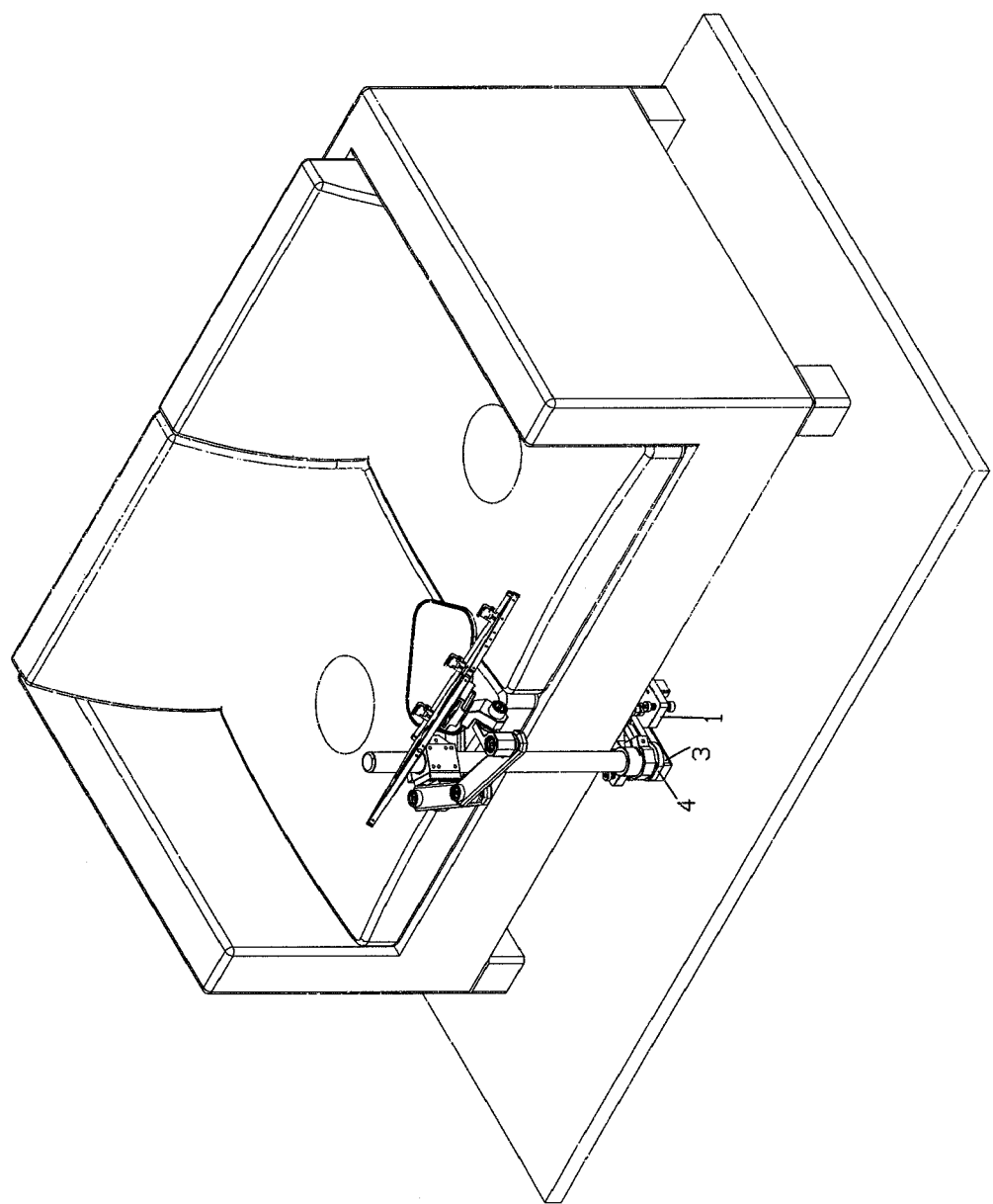
FIG. 4 is a schematic view showing an operation of the preferable embodiment of the present invention.

The supporter consisting of above components can be fixed below a couch or a bed for connecting an extension supporting rack such as a laptop supporting rack. The base plate 1 of the supporter can be placed into the gap below a couch, the pusher 2 can be raised to approach the bottom of the couch with the claws 20 pointing to proper position of the bottom of the couch. By turning the two supporting bolts 24 towards the floor, the supporter can be raised with the claws 20 tightly clutch the couch. The slider 3 can be pulled out to a predetermined position, and the bolt set 42 can be lowered to the floor so that the supporter is fixed to the location. The extension supporting rack can be slid into the sleeve 4 as shown in FIG. 4. For the weight is stably sustained by the floor through the supporting bolts 24 and the bolt set 42, user can place a laptop of book on the extension rack for watching or reading.

Figure 5:
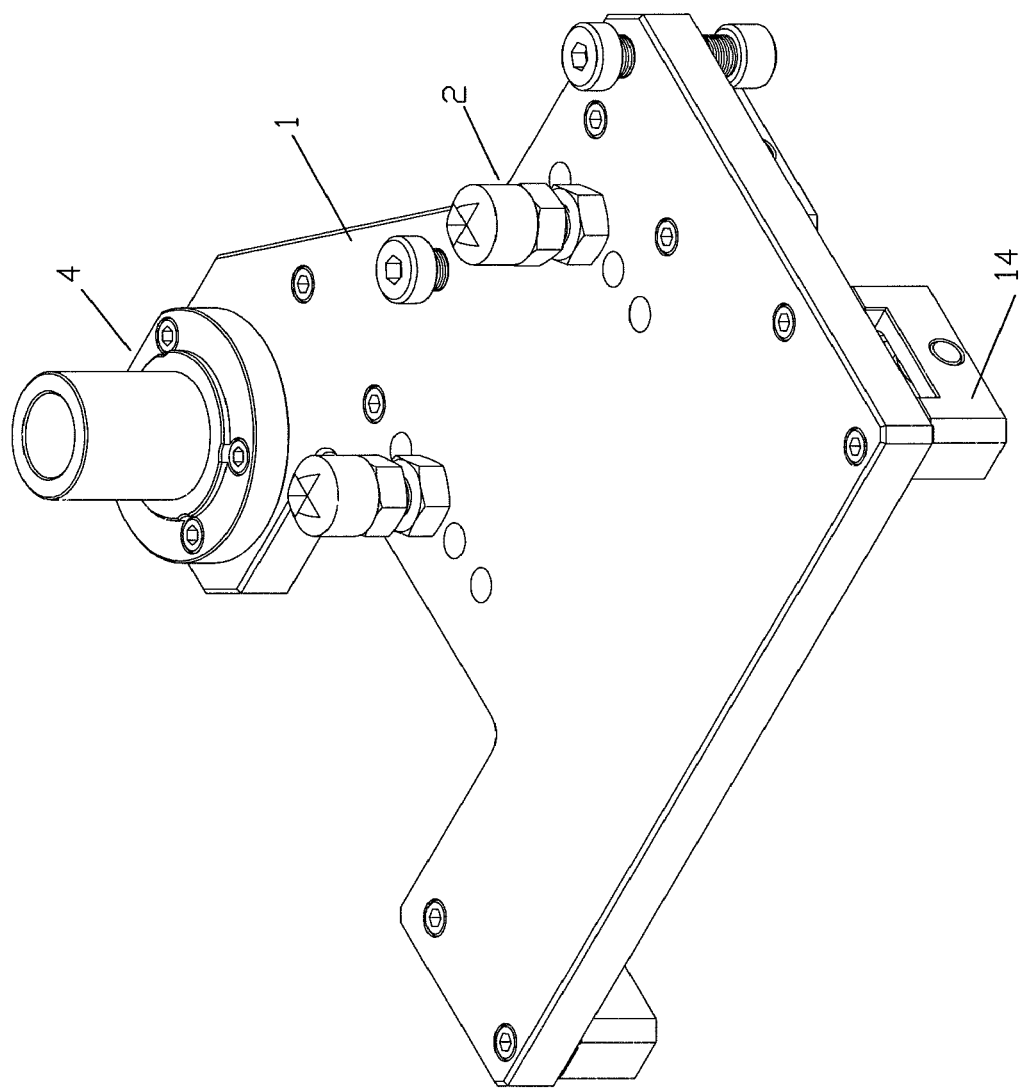
FIG. 5 is a schematic view of a second embodiment of the present invention.
Figure 6:
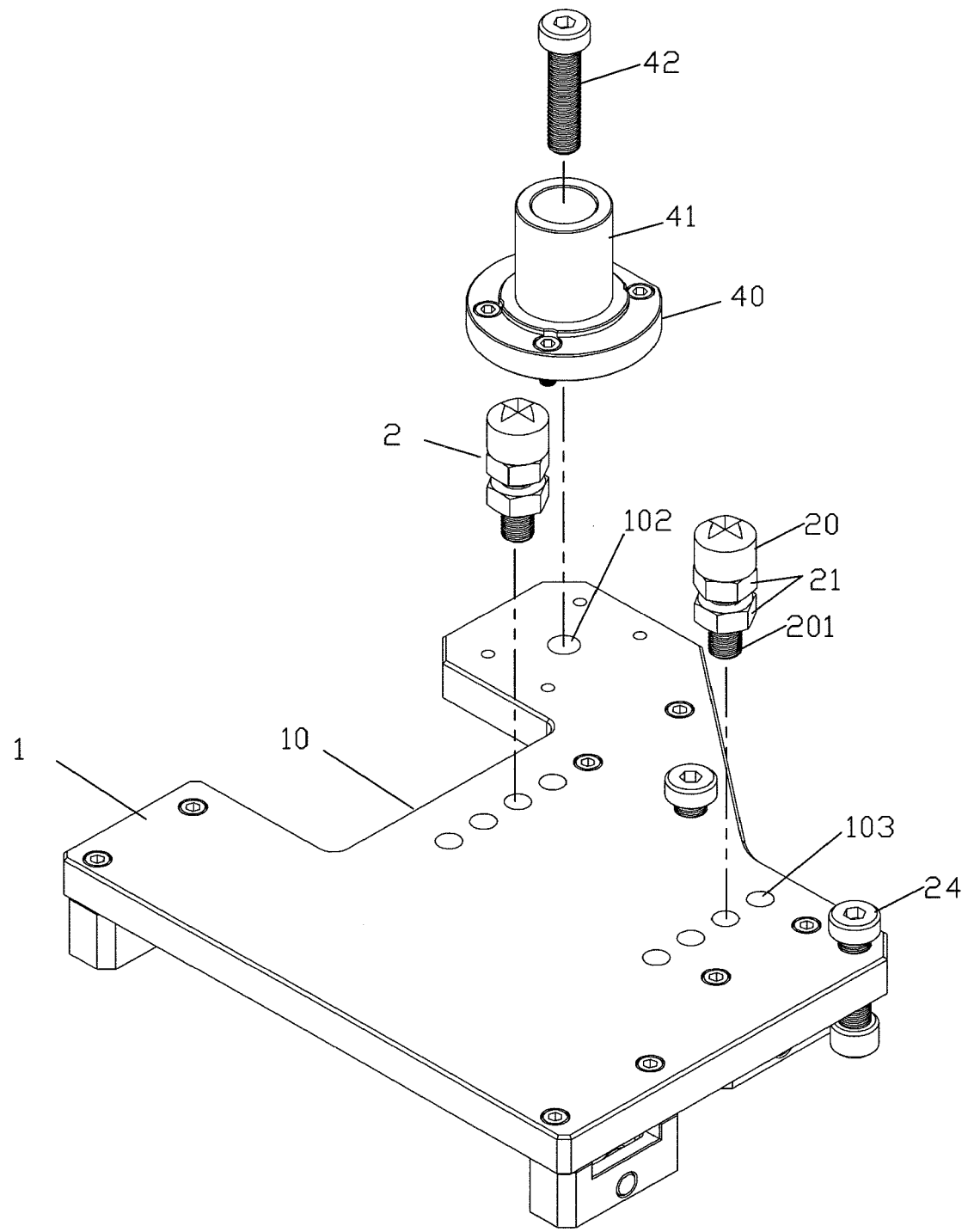
FIG. 6 is an exploded view showing the second embodiment of the present invention.
Figure 7:
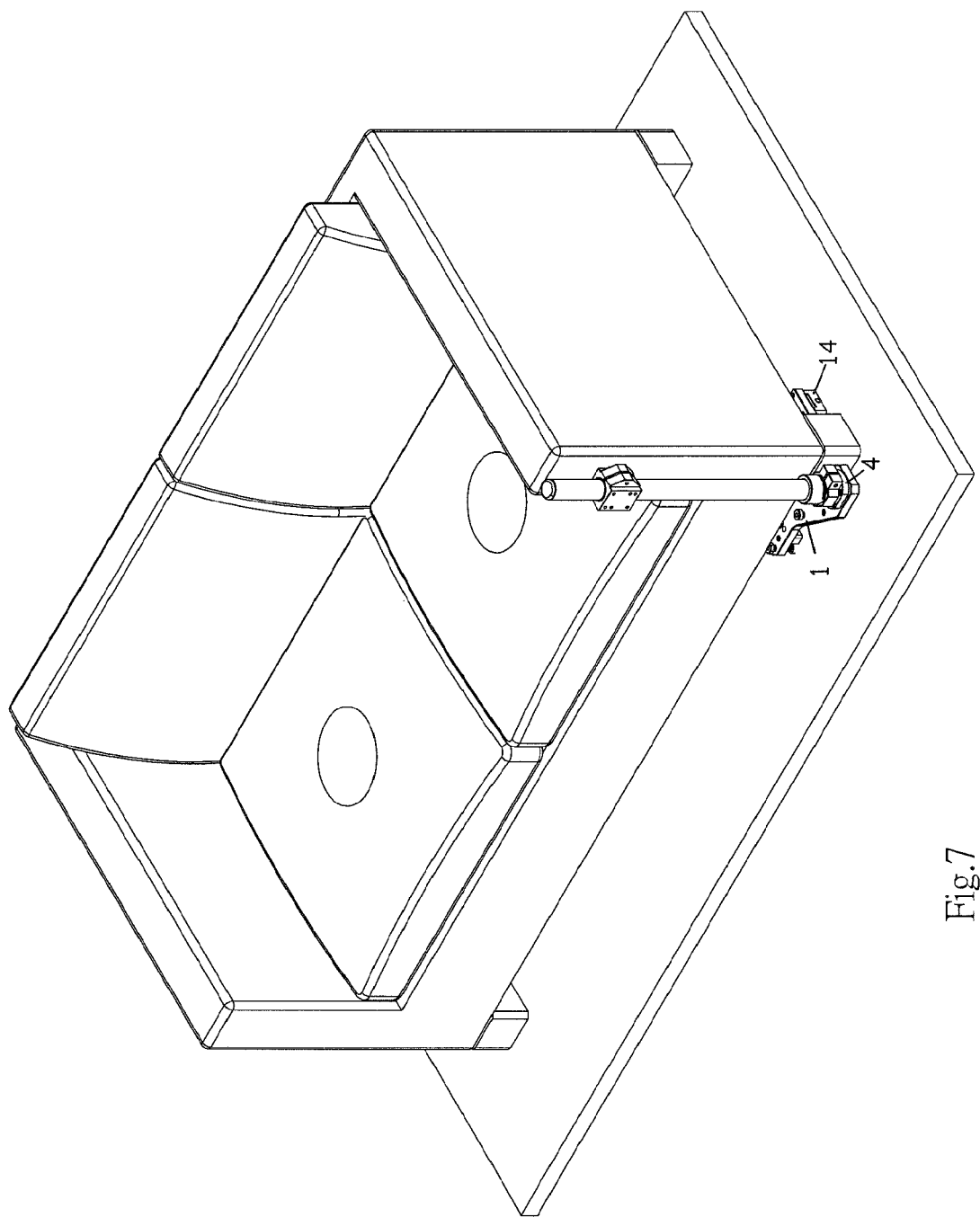
FIG. 7 is a schematic view showing an operation of the second embodiment of the present invention.

Referring to FIGS. 5 to 7, another embodiment of the present invention is illustrated. The differences of the embodiment are the shape of the base plate 1 and the removal of the slider 3. The components of the supporter are described in the following.

A base plate 1 is a polygon having a rectangular notch 10 on a middle of an edge. A through hole 103 is formed beside the notch 10. A plurality of threaded hole 102 with a predetermined interval between each other is formed to the base plate 1. Feet 14 are formed to four bottom corners of the base plate 1 so that the base plate 1 can stand on the floor.

Two pushers 2 are threaded into any two of the plurality of threaded hole 103 depending on the needs. The pusher 2 further has the following components.

A claw 20 has a plurality of tip on an end thereof, a hole is formed to the other end of the claw 20.

A pusher shaft 201 has a protrusion on an end for retaining the hole of the claw 20, the other end of the pusher shaft 201 is a threaded end which can be threaded into the threaded hole 11. By turning the pusher shaft 201, the elongation of the pusher can be adjusted.

A nut 21 is arranged to the threaded end to fix the pusher shaft 201 for maintaining a predetermined height.

A supporting bolt 24 serves to elevate the support so that the pusher 2 can clutch or release a bottom of a couch.

A sleeve 4 has a round base 40 on a lower portion and a hollow cylinder 41 on an upper portion. The base 40 has a flat cut on a side for preventing interference. The base 40 is fixed to the base plate 1 above the through hole 102. A bolt set 42 is arranged to the through hole 102 through the sleeve for securing the position of the base plate 1.

The supporter of the second embodiment can be fixed below a couch or a bed for connecting an extension supporting rack such as a laptop supporting rack. The base plate 1 of the supporter can be placed into the gap below a corner of a couch so that a foot of the couch is just received by the notch 10 as shown in FIG. 7. After turning the pusher 2 to approach the bottom of the couch, the two supporting bolts 24 and the bolt set 42 are turned to elevate the supporter so that the claws 20 can tightly clutch the couch. An extension supporting rack can be slid into the sleeve 4 for operation.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A supporter retained by a bottom of a furniture, comprising:
    a polygonal base plate having a plurality of through holes; four feet being formed to four bottom corners of the base plate for standing on a floor; two pushers threaded into the base plate; at least one supporting bolt for elevating the supporter so that the pushers can clutch or release a bottom of an object;
    a long slider sliding arranged to the bottom surface of the base plate; an end of the slider having a through hole;
    a sleeve having a round base on a lower portion and a hollow cylinder on an upper portion; the base having a flat cut on a side for preventing interference; the base being fixed to the slider above the through hole; a bolt set being arranged to the through hole through the sleeve for securing the slider;
    wherein the supporter serves to be fixed below a couch or a bed for connecting an extension supporting rack; the base plate of the supporter is placed into a gap below a couch, and the pusher is raised to approach a bottom of the couch with claws pointing to a proper position of the bottom of the couch; by turning the at least one supporting bolt towards the floor, the supporter is raised with the claws tightly clutching the couch; the slider is pulled out to a predetermined position; and the bolt set is lowered to the floor so that the supporter is fixed to the location; the extension supporting rack is slid into the sleeve for operation.

2. The supporter as claimed in claim 1, wherein the base plate has a rectangular notch on a middle of an edge; a plurality of threaded hole is formed to the base plate for the pushers; a shallow recess is formed to the bottom surface of the base plate, an end of the recess connects with an inner edge of the notch; two retainers are fixed across the recess so that a sliding groove is formed to the recess.

3. The supporter as claimed in claim 2 further comprising:
    a slider of a long plate slid into the recess of the base plate within the retainer; an outer end of the slider has a through hole for connecting the sleeve; the sleeve being arranged onto the slider above the through hole; the bolt set being arranged to the through hole through the sleeve for securing the position of the slider.

4. The supporter as claimed in claim 1, wherein the pusher further includes a claw having a plurality of tip on an end thereof, and a hole is formed to the other end of the claw; a pusher shaft has a protrusion on an end for retaining the hole of the claw, and the other end of the pusher shaft is a threaded end which is threaded into the threaded hole of the base plate; by turning the pusher shaft, the elongation of the pusher can be adjusted; a nut is arranged to the threaded end of the pusher shaft for retaining the position.

5. The supporter as claimed in claim 1, wherein the base plate has a rectangular notch on a middle of an edge; a through hole is formed beside the notch; a plurality of threaded hole with a predetermined interval between each other is transversely formed to the base plate; the base plate of the supporter is placed into the gap below a corner of a couch so that a foot of the couch is just received by the notch; after turning the pushers to approach the bottom of the couch, the supporter is tightly fixed below the couch.

6. The supporter as claimed in claim 5, wherein the pusher is threaded into any of the plurality of threaded hole depending on the needs with a predetermined height; the pusher includes a claw having a plurality of tip on an end thereof, and a hole is formed to the other end of the claw; a pusher shaft has a protrusion on an end for retaining the hole of the claw, and the other end of the pusher shaft is a threaded end which is threaded into the threaded hole of the base plate; by turning the pusher shaft, the elongation of the pusher can be adjusted; a nut is arranged to the threaded end of the pusher shaft for retaining the position.

7. The supporter as claimed in claim 5, wherein the base of the sleeve is fixed to the base plate above the through hole; a bolt set is arranged to the through hole through the sleeve for securing the position of the base plate.

* * * * *